United States Patent [19]
Smith et al.

[11] Patent Number: 5,988,443
[45] Date of Patent: *Nov. 23, 1999

[54] FLEXIBLE TUBE WITH PUMP DISPENSER AND METHOD OF MAKING

[75] Inventors: Roger P. Smith; Kent A. Gearhart; Earnest E. Bliss, III, all of Perrysburg, Ohio

[73] Assignee: Owens-Brockway Plastic Products Inc., Toledo, Ohio

[*] Notice: This patent is subject to a terminal disclaimer.

[21] Appl. No.: 08/942,115

[22] Filed: Oct. 1, 1997

Related U.S. Application Data

[63] Continuation-in-part of application No. 08/493,837, Jun. 22, 1995, Pat. No. 5,687,878, which is a continuation-in-part of application No. 08/228,048, Apr. 15, 1994, Pat. No. 5,632,951.

[51] Int. Cl.$^6$ .................................................. B65D 35/54
[52] U.S. Cl. .......................................... 222/96; 222/321.9
[58] Field of Search ............................... 222/95, 96, 107, 222/212, 321.8, 321.9

[56] References Cited

U.S. PATENT DOCUMENTS

| | | | |
|---|---|---|---|
| 1,547,759 | 7/1925 | Journeay . | |
| 2,491,406 | 12/1949 | Zeeb | 285/120 |
| 3,191,814 | 6/1965 | Corsette et al. | 222/384 |
| 3,263,871 | 8/1966 | Thompson | 222/384 |
| 3,288,334 | 11/1966 | Corsette | 222/107 |
| 3,358,062 | 12/1967 | Lemelson | 264/96 |
| 3,596,808 | 8/1971 | Corsette | 222/385 |
| 3,923,250 | 12/1975 | Boris | 222/385 |
| 3,934,763 | 1/1976 | Steiman | 222/321 |
| 3,940,029 | 2/1976 | Horvath | 222/340 |
| 3,955,720 | 5/1976 | Malone | 222/396 |
| 4,154,374 | 5/1979 | Kirk, Jr. | 222/321 |
| 4,174,052 | 11/1979 | Capra et al. | 222/207 |
| 4,193,551 | 3/1980 | Saito et al. | 239/333 |
| 4,216,883 | 8/1980 | Tasaki et al. | 222/321 |
| 4,344,744 | 8/1982 | Schuster et al. | 417/550 |
| 4,345,691 | 8/1982 | Burke | 215/216 |
| 4,434,916 | 3/1984 | Ruscitti et al. | 222/321 |
| 4,479,589 | 10/1984 | Ford | 222/153 |
| 4,510,115 | 4/1985 | Gokcen et al. | 264/515 |
| 4,591,076 | 5/1986 | Iizuka | 222/321 |
| 4,685,594 | 8/1987 | Czech | 222/182 |
| 4,692,103 | 9/1987 | Anderson | 417/547 |
| 4,747,517 | 5/1988 | Hart | 222/137 |
| 4,790,117 | 12/1988 | Hansen | 53/410 |
| 4,854,484 | 8/1989 | Gentile et al. | 222/256 |
| 4,941,599 | 7/1990 | Reinertz et al. | 222/401 |
| 5,004,123 | 4/1991 | Stoody | 222/94 |
| 5,011,046 | 4/1991 | Graf et al. | 222/321 |
| 5,064,102 | 11/1991 | Montaner | 222/147 |
| 5,083,683 | 1/1992 | Knickerbocker | 222/382 |
| 5,102,018 | 4/1992 | Desazars de Montgailhard | 222/321 |
| 5,163,588 | 11/1992 | Cater | 222/321 |
| 5,183,185 | 2/1993 | Hutcheson et al. | 222/209 |
| 5,183,188 | 2/1993 | Rebeyrolle et al. | 222/383 |
| 5,687,878 | 11/1997 | Smith et al. | 222/96 |

FOREIGN PATENT DOCUMENTS 0749909 12/1996 European Pat. Off. .

*Primary Examiner*—Joseph A. Kaufman

[57] ABSTRACT

A flexible tube and pump dispenser for lotions and the like including a flexible plastic tube having a first end and a second end. The tube includes an integral rigid finish at one end which has a radial flange and a radially inwardly extending wall. The flange has an opening therethrough. A pump dispenser having a plunger and an axial body extends through the opening in the sealing flange of the finish. The axial body of the pump dispenser has a flange engaging the flange of the finish. The flange on the body is held in position engaging the wall on the finish.

8 Claims, 12 Drawing Sheets

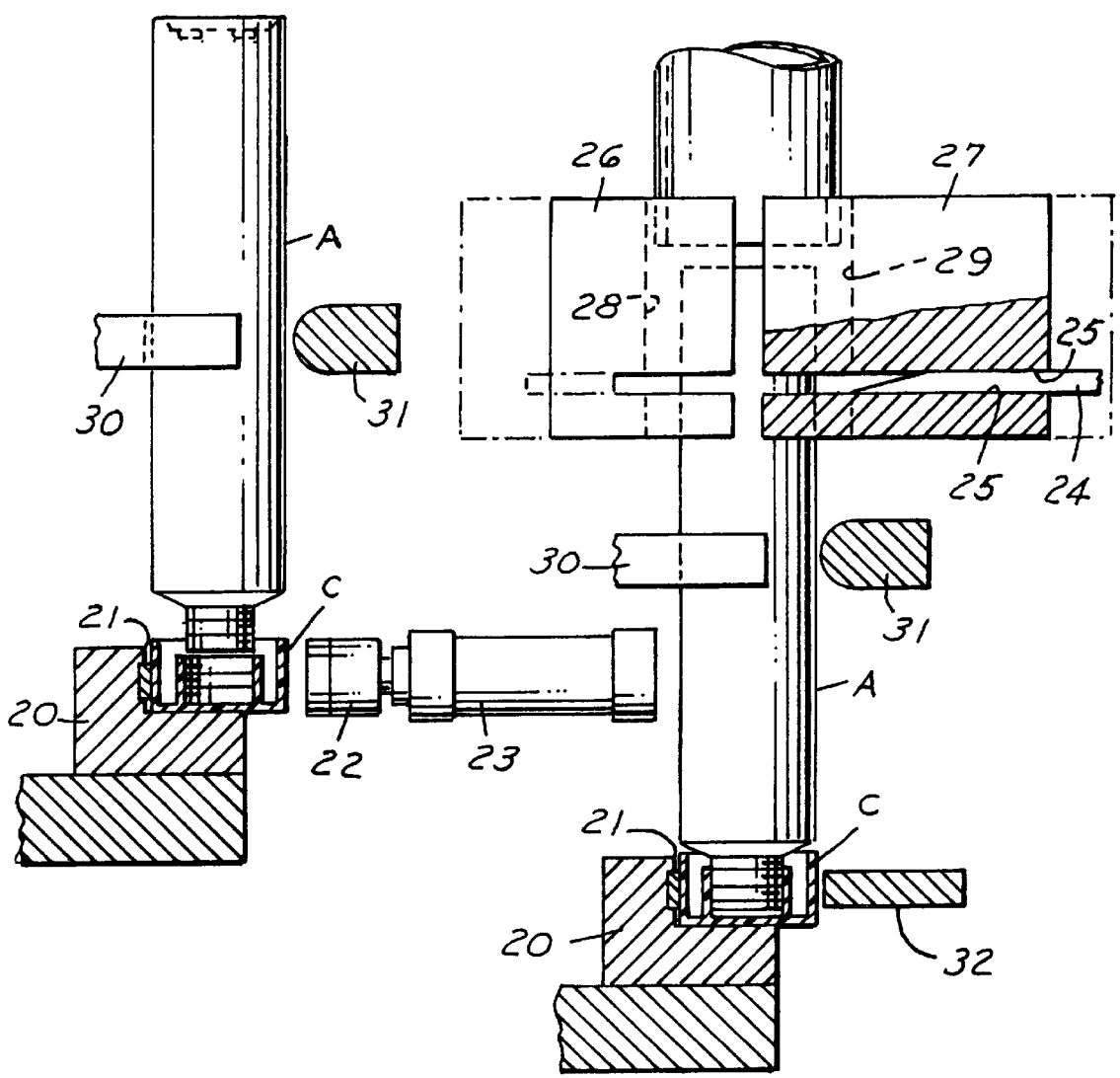

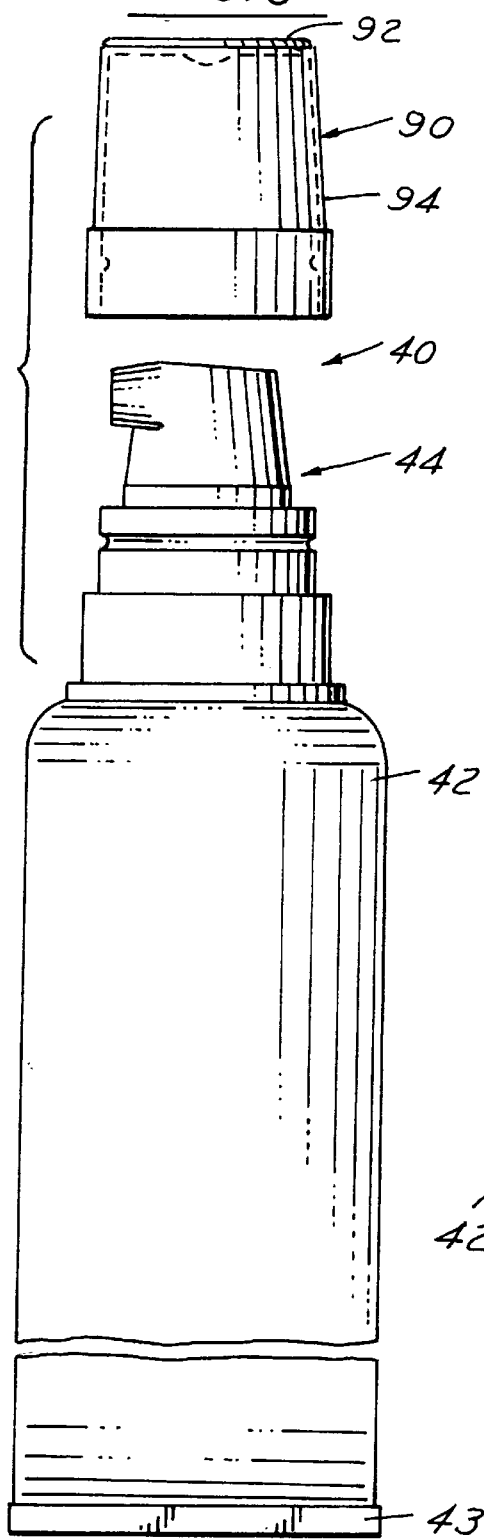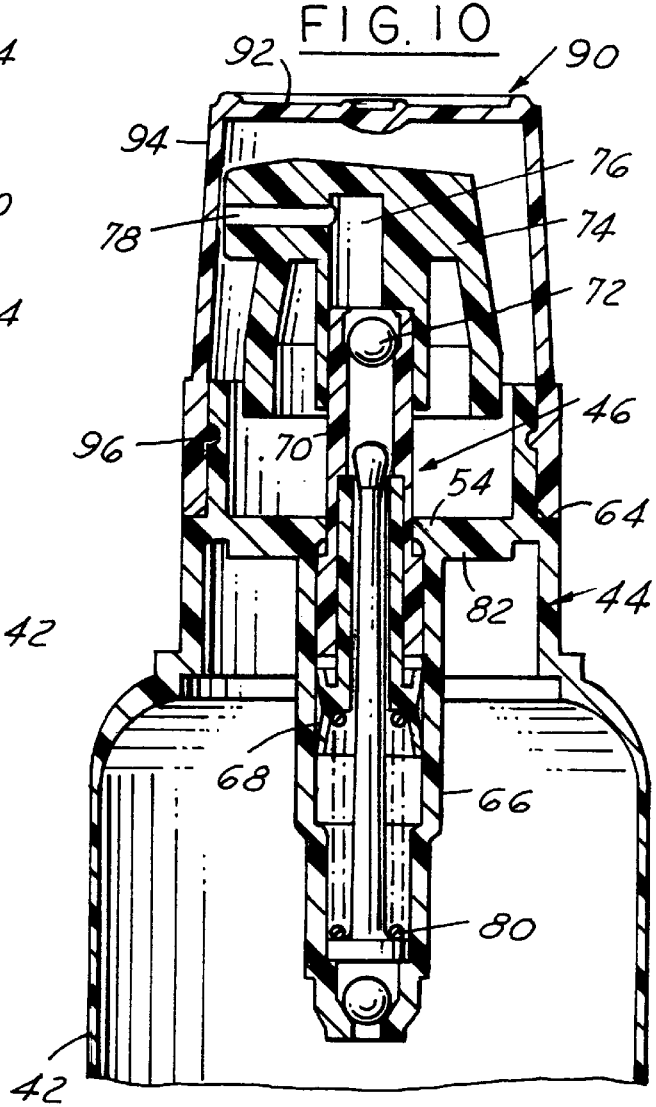

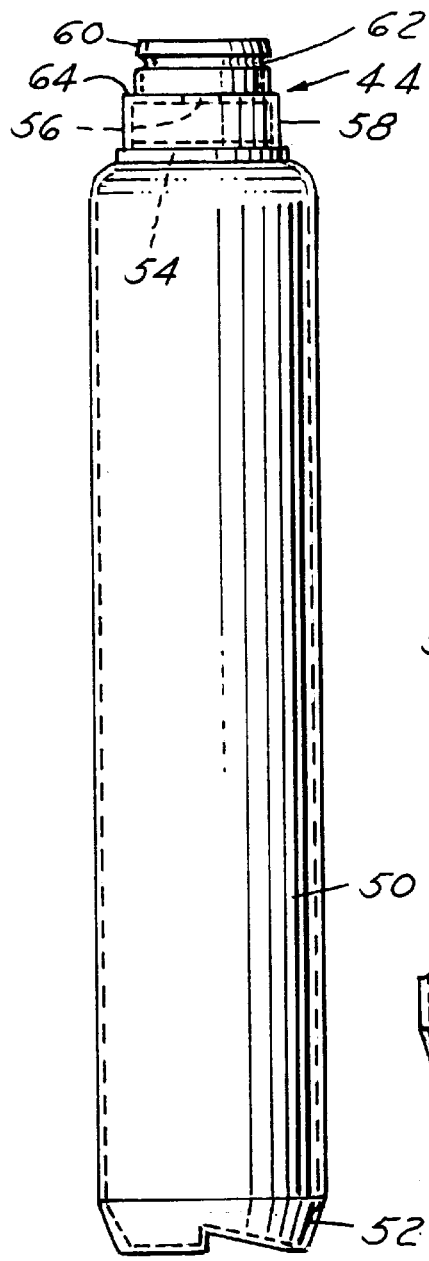
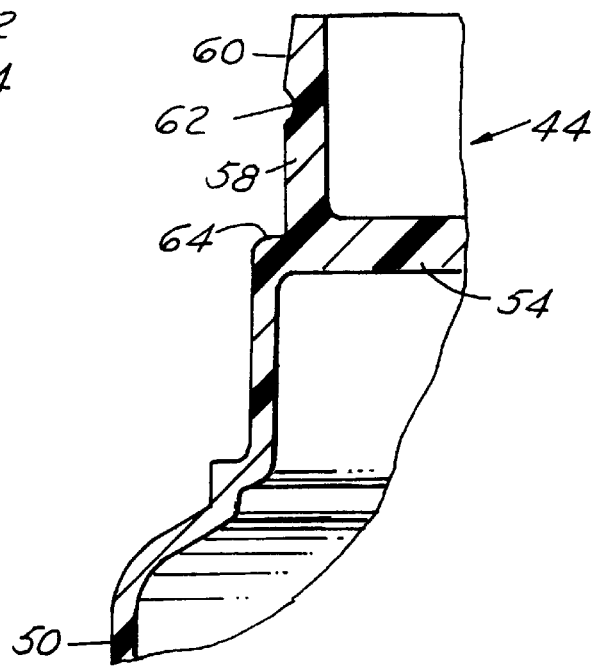
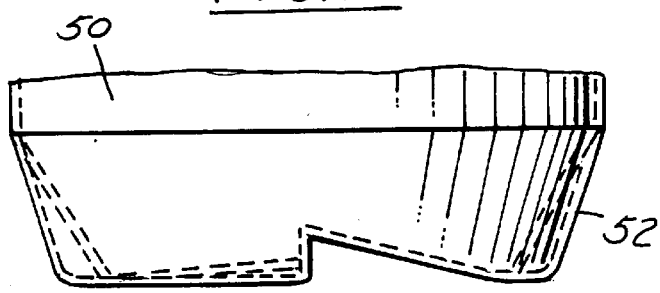
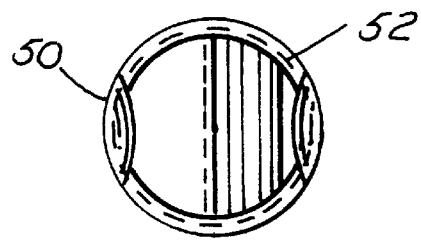

FIG. 28
FIG. 29
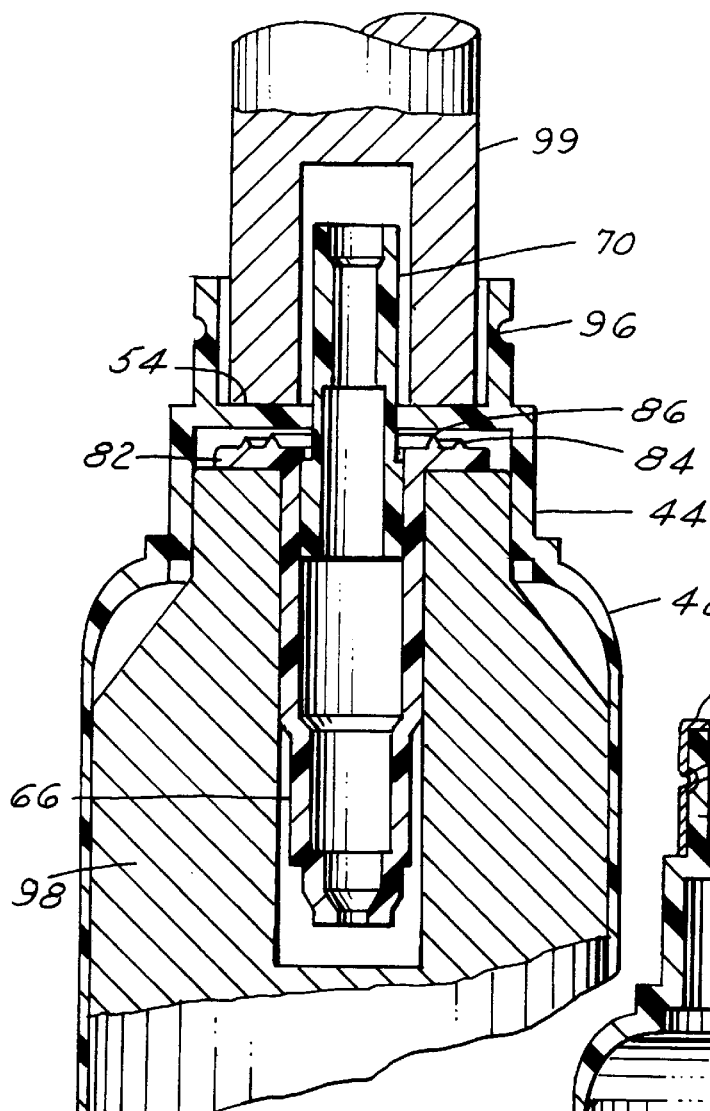
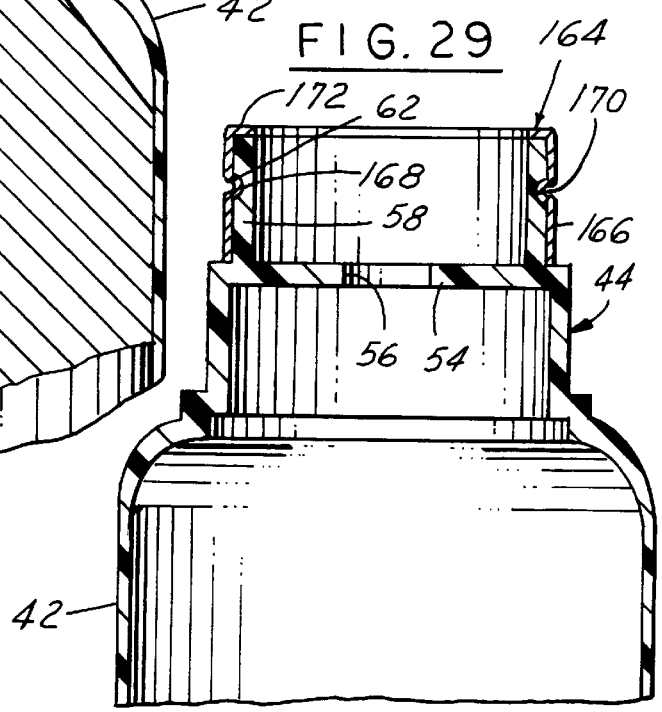

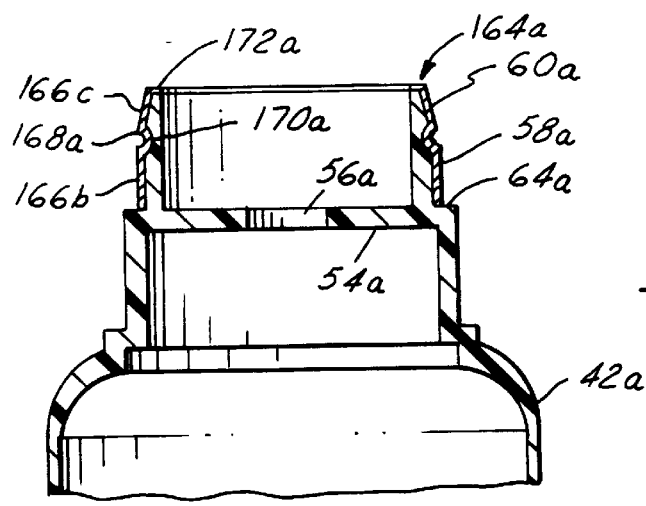
FIG. 30
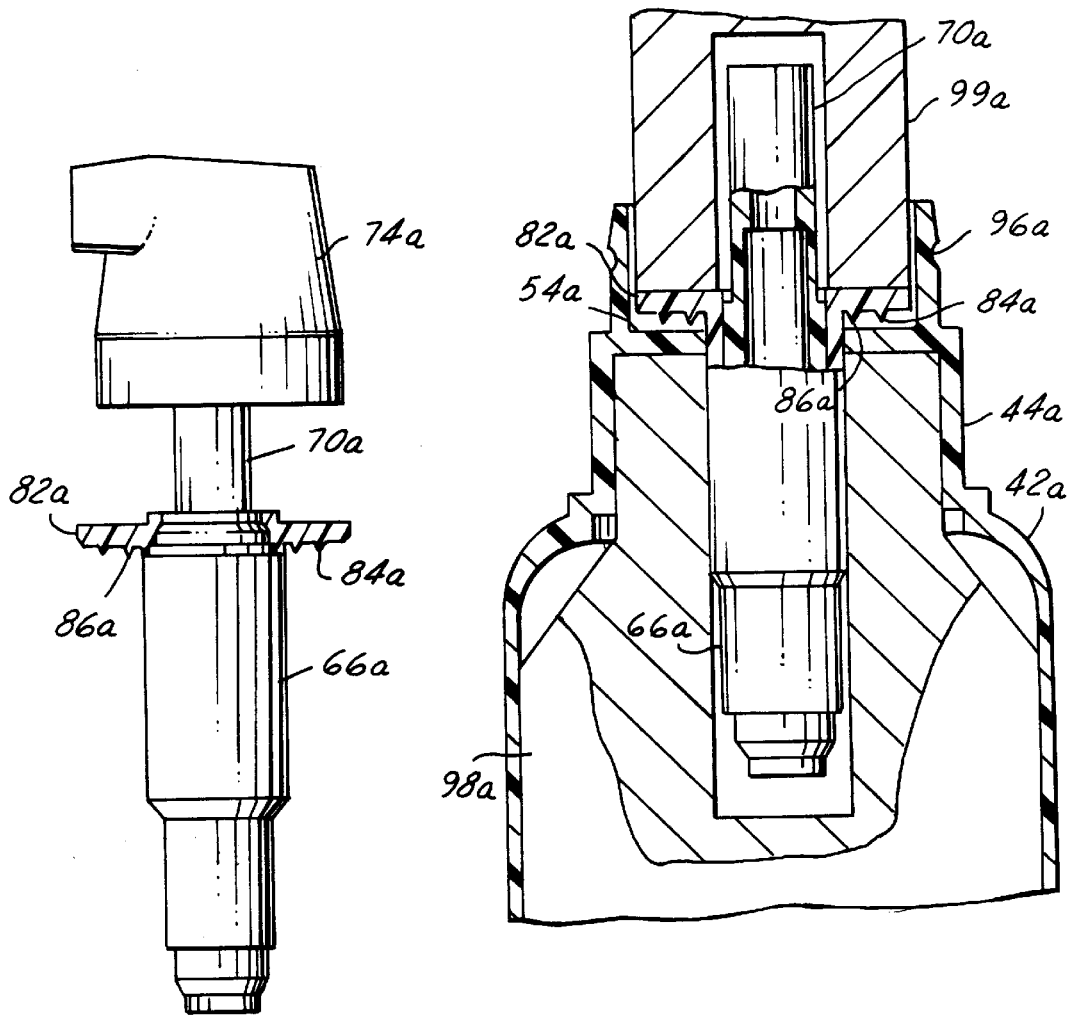
FIG. 31
FIG. 32

FLEXIBLE TUBE WITH PUMP DISPENSER AND METHOD OF MAKING

This application is a continuation-in-part of application Ser. No. 08/493,837 filed Jun. 22, 1995, now U.S. Pat. No. 5,687,878, which was a continuation-in-part of application Ser. No. 08/228,048 filed Apr. 15, 1994, now U.S. Pat. No. 5,632,951.

This invention relates to the manufacture of flexible tubes utilized for containing and dispensing viscous products such as personal care products and including a pump dispenser.

BACKGROUND OF THE INVENTION

In the U.S. Pat. No. 5,632,951, incorporated herein by reference, a method is disclosed of making a flexible plastic tube which comprises injection molding a finish having an opening, extruding a tube integrally with the finish by relative movement of the finish with respect to an extruded orifice while continuing continuously extruding the tube, closing a blow mold about the extruded tube, blowing the tube into an integral container body having a closed bottom, opening the mold to provide an integral flexible tube with a finish thereon. Thereafter the method consists of decorating the body with indicia, cutting the closed end of the tube leaving an open-ended tube at the end opposite the finish, and applying a closure to the finish. A closure is applied either before or after cutting the bottom from the container. Preferably, the closure is applied to the finish after decorating and before cutting the closed end. Subsequently, the tube is filled through the open end and the open end is sealed. The step of decorating includes rotating the tube about the longitudinal axis of the tube while engaging the finish and bottom. The step of decorating preferably comprises rotating the container relative to a silk screen printing device. The step of injection molding and extrusion molding preferably comprises injecting and extruding linear low density polyethylene may be used.

Among the objective of the present invention are to provide a flexible tube made in accordance with the aforementioned method which includes a pump dispenser; wherein the pump dispenser is assembled to the plastic tube after it has been formed; wherein when the tube is formed with a finish for receiving the pump dispenser; wherein one from this pump dispenser is assembled through the open end of the tube; wherein in another form the pump dispenser is assembled on the finish from above; wherein the pump actuator can be made with a different color from the tube.

In accordance with the invention, the flexible tube with an integral finish includes a transverse wall having an opening for receiving the body of a pump dispenser. In one form the pump dispenser is inserted in the tube through the open end of the tube before the tube is filled and a flange on the pump dispenser is attached to the underside of the transverse wall of the finish, preferably by welding as by ultrasonic welding or spin welding. In another form, the flange is attached to the upper side of the transverse wall of the finish. In another form, a collar is provided which has an outer annular wall, an integral inner annular wall spaced from said outer wall and an integral radial wall extending inwardly from the inner wall. The outer wall of the collar and the finish are mounted on the finish. The pump dispenser extends through the opening in the finish and a flange on the pump body extends through the opening in the finish and a flange on the pump body extends between the transverse wall of the collar and the transverse wall of the finish. A sealing member is preferably interposed between the flange on the pump dispenser and transverse wall of the finish.

DESCRIPTION OF THE DRAWINGS

FIG. 7 is a fragmentary part sectional view of a preferred method and apparatus for applying the closure.

FIG. 8 is a fragmentary part sectional elevational view of an apparatus for severing the bottom from the container after it is decorated.

FIG. 9 is a fragmentary exploded view of a package comprising the invention.

FIG. 10 is a fragmentary vertical sectional view of the upper end of the package.

FIG. 11 is an elevational view of the flexible container from which the flexible tube used in the package shown in FIGS. 9 and 10 is made.

FIG. 12 is a fragmentary sectional view on an enlarged scale of the finish on the container shown in FIG. 11.

FIG. 13 is a fragmentary view on an enlarged view of the lower end of the container shown in FIG. 11.

FIG. 14 is a bottom plan view of the container shown in FIG. 11.

FIG. 28 is a fragmentary vertical sectional view of an apparatus for assembling the flexible tube and pump dispenser shown in FIGS. 9–15.

FIG. 29 is a fragmentary vertical sectional view showing a modified form.

FIG. 30 is a fragmentary sectional view of a modified tube.

FIG. 31 is a view similar to FIG. 17 showing a modified form of pump dispenser.

FIG. 32 is a view similar to FIG. 28 of an apparatus for assembling the flexible tube and pump dispenser of FIG. 31 to a container.

DETAILED DESCRIPTION OF THE PREFERRED EMBODIMENTS

Referring to FIGS. 1–8, which is a schematic view of the succession of steps A–F to produce a filled container, the first step A comprises making a hollow plastic container by a method and apparatus wherein the neck or finish of the container is first injection molded, then a tube is extruded integrally with the injection molding finish, molds are closed about the tube and the tube is blown to form a container. Such a method and apparatus is shown in U.S. Pat. Nos. 2,170,987 and 2,911,673, incorporated herein by reference, and embodied in what has become known as a BC-3 machine.

Figure 1:
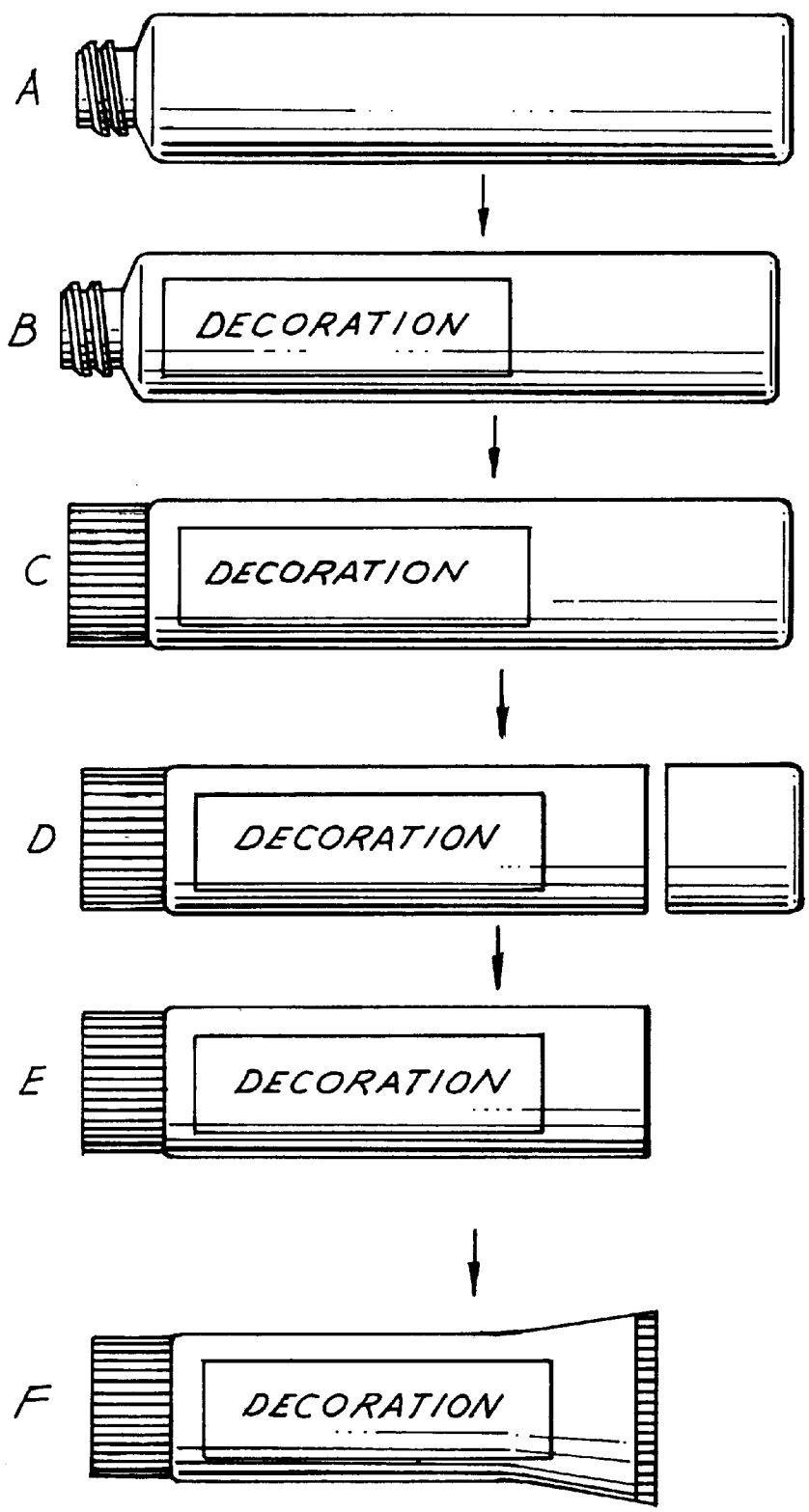
FIG. 1 is a diagram of the steps in making the flexible plastic tube embodying the invention.

As further shown in FIG. 1, the hollow blown container is then applied with indicia or decoration in one or more colors and designs through step B as may be desired. Step C of FIG. 1 shows applying a closure C to the container. The bottom of the container is then cut off as in step D leaving an open-ended tube as shown in step E. Step E shows the tube with the closure thereon as delivered to a customer. The purchaser of the open-ended tube fills the tube with viscous product through the open end and then seals the open end as at F.

A closure can be applied either before or after decorating, herein shown as applied after the first decorating step B. Preferably, the closure is applied after decorating.

Figure 2:
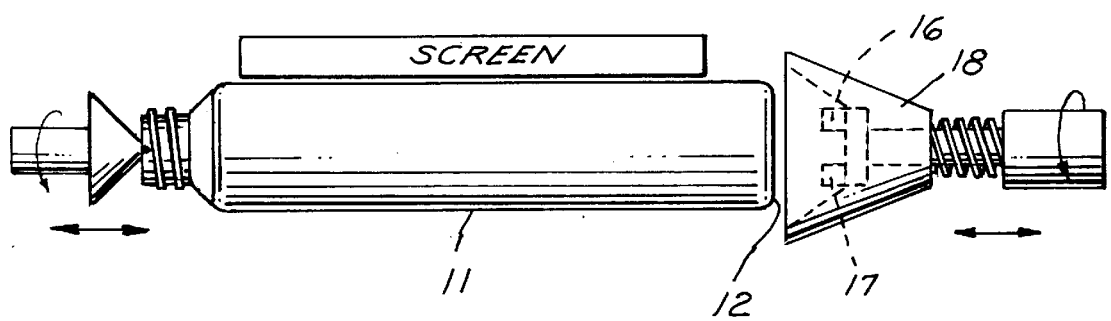
FIG. 2 is a diagram of an apparatus for silk screen decorating of the container.
Figure 3:
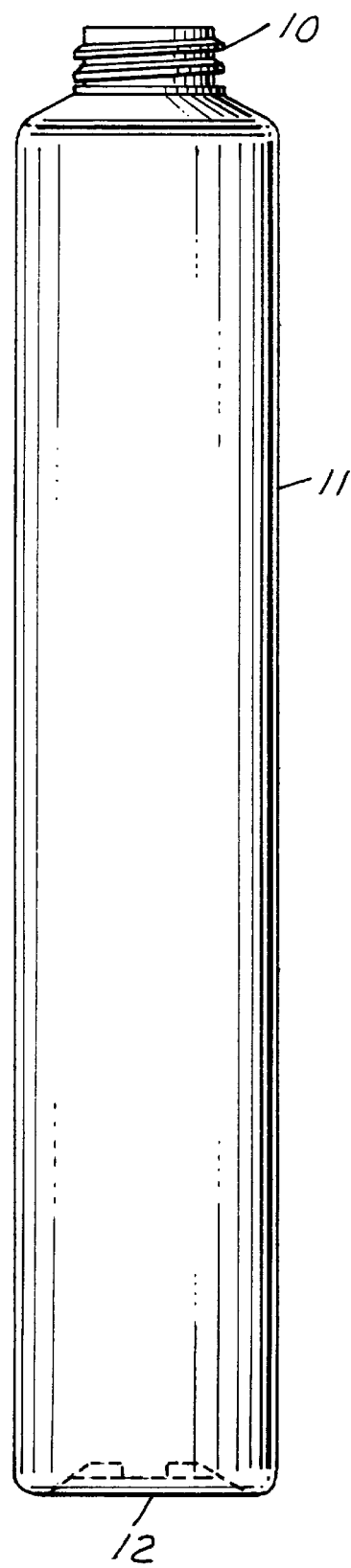
FIG. 3 is an elevational view of the container which is used to make the tube.

In accordance with the invention, the decorating steps are performed by rotating the container with respect to silk screen printer station, as shown for example in FIG. 2, by clamping the container and rotating the container relative to the station. Alternatively, decorating can be by in-mold labeling during blow molding of the tube or by heat bonding a label after the container is blow.

Referring to FIGS. 3–6, the container preferably comprises the injection mold finish 10, the extruded side wall or body 11 sufficiently thin thickness that it is flexible, and the integral bottom wall 12 which is thicker and relatively rigid to allow for driving the tube to rotate the tube in the capping and decorating operations. The wall 11 is preferably of substantially constant thickness, for example, ±0.006 in.

Figure 4:
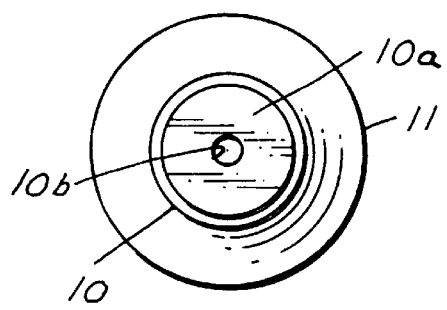
FIG. 4 is a top plan view.
Figure 5:
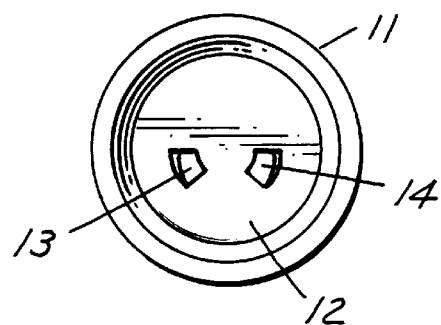
FIG. 5 is a bottom plan view.
Figure 6:
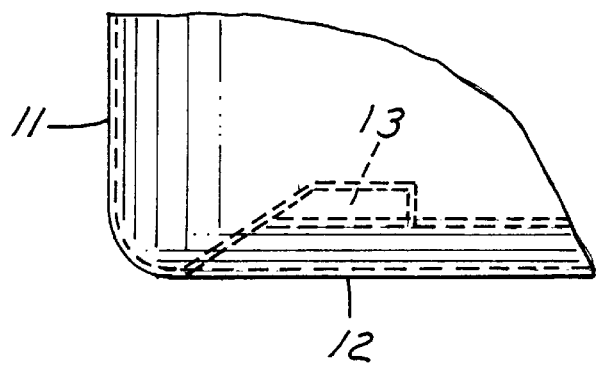
FIG. 6 is a fragmentary view of a portion of the lower end of the container.

As shown in FIGS. 5 and 6, the bottom wall 12 is formed with indentations or recesses 13, 14 which are utilized so that they can be engaged by lugs 16, 17 of a chuck 18 (FIG. 2) for the printing and application of the closure. As shown in FIG. 4, the finish 10 preferably includes a top or transverse wall 10a having a centrally located dispensing opening 10b.

The container is preferably made of linear low density polyethylene. A preferred composition is linear low density polyethylene. A preferred composition is linear low density polyethylene and low density polyethylene may be used.

Referring to FIGS. 7 and 8, a preferred form of apparatus is shown in U.S. Pat. No. 5,621,960, having a common assignee with the present application, incorporated herein by reference.

Referring to FIG. 8, the apparatus for severing the bottom of a container comprises a lower star wheel 20 having recesses 21 for receiving the closures C on the inverted container A and an associated guide rail 32. The apparatus also includes an upper star wheel 30 with recesses for the container body 34 and an associated guide rail 31. The upper end of the container is clamped by blocks 26, 27 having recesses 28, 29 which are movable relative to one another to hold the upper end of the container A. A guillotine blade 24 is movable across the bottom of the closure by a cylinder to sever the bottom of the container A along a plane that is at 90° to the vertical or longitudinal axis of the container A. The guillotine 24 is guided by guide surfaces 25 in the blocks 26, 27.

The apparatus of FIG. 7 is preferably positioned at a capping station adjacent a rotary turret 30 which is driven intermittently past the capping station to apply the container to the closure. The apparatus shown in FIG. 8 is located at a trimming station and the turret 30 moves the inverted containers past the trimming station to sever the bottom of the container in recesses the lower star wheel during severing of the bottom of the container.

The above description is substantially like that in the aforementioned U.S. Pat. No. 5,632,951. Referring to FIGS. 9 and 10, the flexible tube and pump dispenser package 40 embodying the invention comprises a flexible tube 42 having an integral finish 44 and a pump dispenser 46 attached to the finish 44 as presently described.

Referring to FIGS. 11–14, the flexible container 48 from which the flexible tube 42 is formed comprises a flexible cylindrical body 50, a base 52 which is subsequently cut off in the aforementioned manner and the integral finish 44, the finish 44 includes a transverse radial wall 54 having an enlarged opening 56 for receiving a portion of the pump dispenser 46 as presently described. The finish 44 further includes an integral annular wall 58 that extends axially from the wall, for reasons presently described. The annular wall 58 includes an annular inwardly tapered outer surface 60 at its upper and an annular groove 62 intermediate its upper end and transverse wall 54 outwardly extending shoulder 64 is also provided on the finish.

Figure 17:
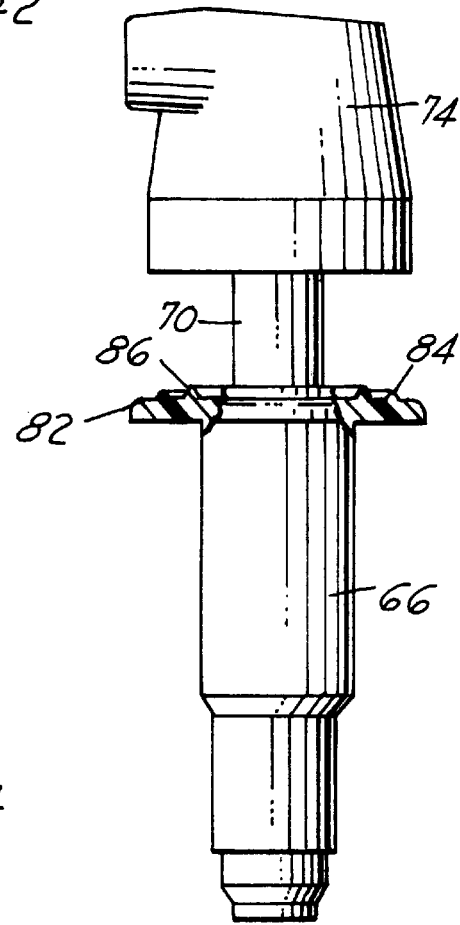
FIG. 17 is an elevational view of the pump dispenser before it is applied to the flexible tube.
Figure 16:
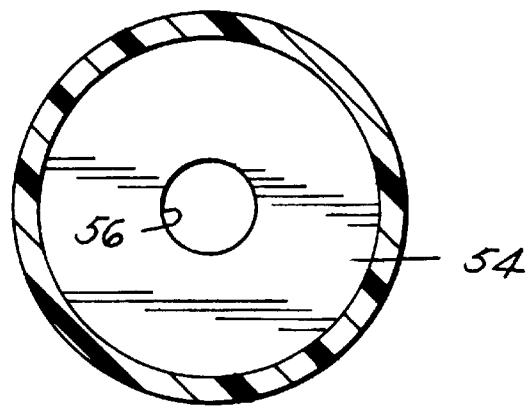
FIG. 16 is a sectional view taken along the line 16—16 in FIG. 15.

Referring to FIGS. 10 and 17, the pump dispenser 46 consists of a pump body 66, a piston 68 and a stem 70 movable with the piston 68. A ball 72 is provided at the upper end of stem 70 and has limited axial movement. Similarly a ball 73 as provided at the lower end of stem 70 and has limited movement. The pump dispenser further includes an actuator 74 having passages 76, 78 through which the contents are dispensed when the actuator is moved downwardly against the action of the spring 80. Such a construction is old and well known.

In accordance with the invention, the body 66 of the pump dispenser 46 is provided with an integral flange 82 (FIG. 17) that is bonded to the underside of the transverse wall 54 by welding, as by ultrasonic welding. The upper surface of the flange 82 is provided with annular V-shaped ribs 84, 86 that are concentric with one another, rib 86 having a greater axial height than rib 84 such that when the sonic welding occurs the ribs will fuse to the underside of the transverse wall 54 of the tube thereby accommodating any variations in the under surface of the wall 54 (FIG. 10). Preferably, the rib 86 is spaced inwardly of the rib 84.

In the making of the package, the pump dispenser 46 is inserted through the open end of the tube 42 prior to the filling and closing of the tube, and the flange 82 is sonic welded to the wall 54 by engagement of a mandrel 98 with the flange 54 and a complementary mandrel 99 with the top surface of the wall 54 as shown schematically in FIG. 28.

The tube 42 is then filled with product and sealed as at 43. The package further includes an overcap 90 that has a base wall 92 and a peripheral skirt 94 with an inner annular rib 96 engaging the annular groove 60. The lower edge of skirt 94 engages the shoulder 64.

Figure 18:
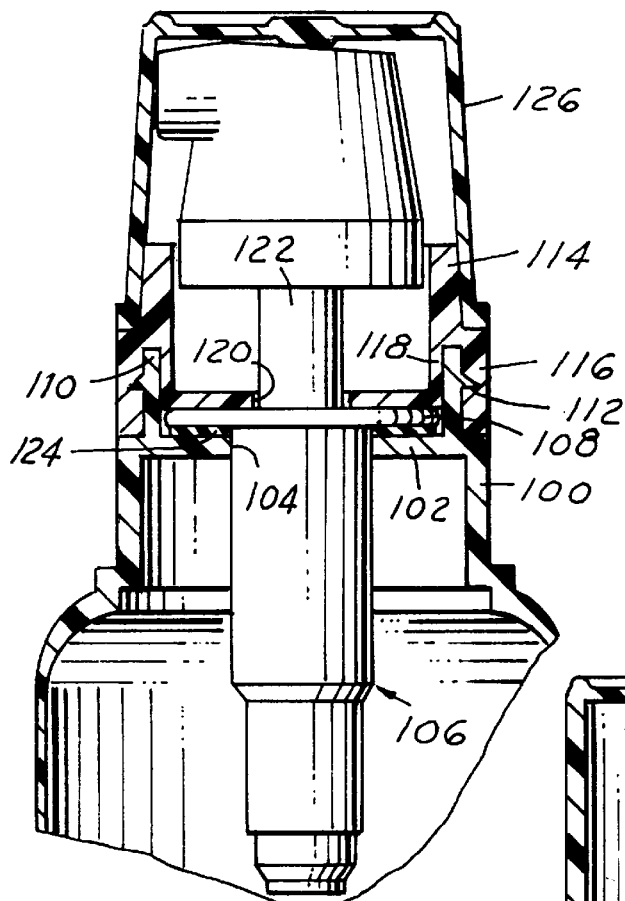
FIG. 18 is a fragmentary vertical sectional view of a modified form of flexible tube and pump dispenser.

In the form shown in FIG. 18, the finish 100 is formed with a transverse wall 102 having an opening 104 for receiving the body of the pump dispenser 106 which is identical in construction with that shown in FIGS. 11–17 except the flange 108 does not have the annular ribs 84, 86 for sonic welding. The annular wall 110 of the finish is formed with an asymmetrical rib 112 over which a collar or fitment 114 is provided. The collar 114 includes an annular outer wall 116 and an annular inner wall 118 having an opening 120 through which the stem 122 of the pump dispenser 101 extends. The collar 114 functions to hold the flange 106 of the pump dispenser 105 in engagement with the transverse wall 102, preferably with a resilient seal 124. In this form, overcap 126 has friction fit with the finish.

Figure 19:
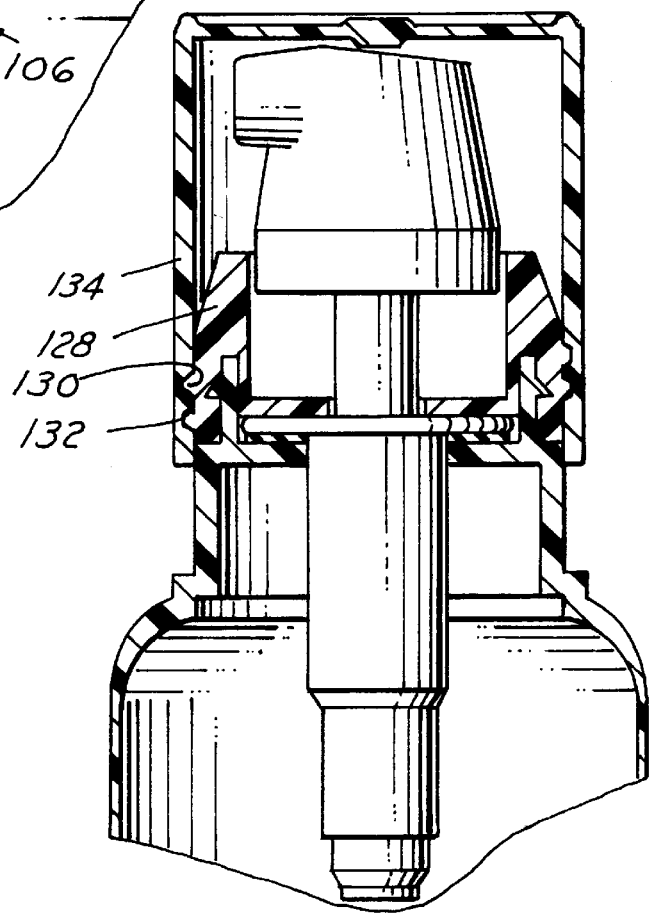
FIG. 19 is a fragmentary vertical sectional view of a further modified form of flexible tube and pump dispenser.

The form shown in FIG. 19 is substantially identical of that shown in FIG. 18, except that the collar 128 is formed with a thread 130 for engaging a complementary thread 132 on the overcap 134.

Figure 20:
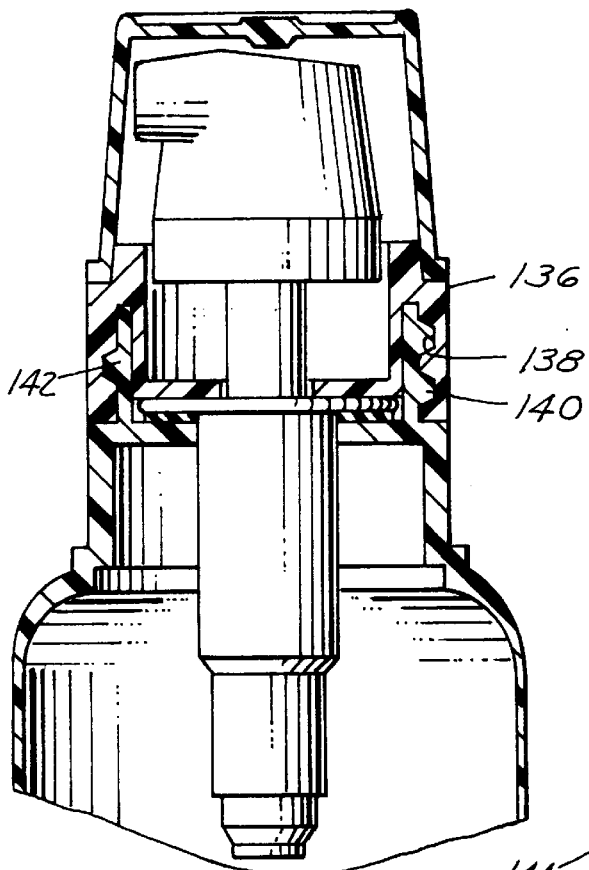
FIG. 20 is a fragmentary vertical sectional view of another form of flexible tube and pump dispenser.

In the form shown in FIG. 20, the collar 136 is provided with an internal thread 138 engaging an external thread 140 on the wall 142 of the finish. In this form, the overcap is frictionally held, as in the form shown in FIG. 18.

Figure 21:
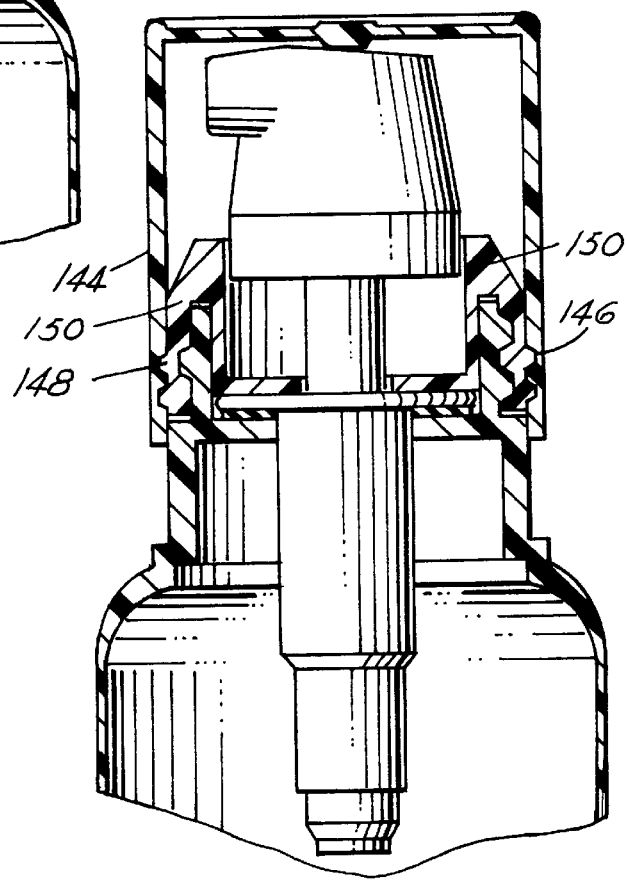
FIG. 21 is a fragmentary vertical sectional view of a further form of flexible tube and pump dispenser.

In the form shown in FIG. 21, the structure is substantial identical to that of FIG. 20, except that the overcap 144 is provided with an internal thread 146 engaging an external thread 148 on the collar 150.

Figure 22:
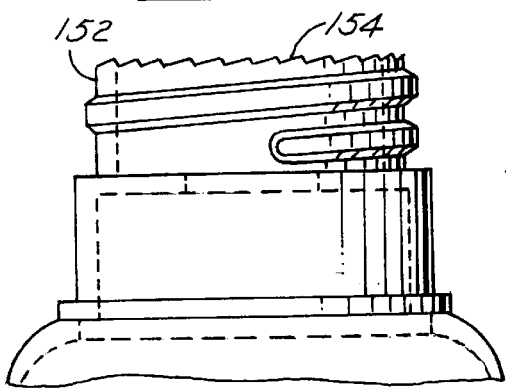
FIG. 22 is a fragmentary elevational view of a modified form of finish on the flexible tube.
Figure 23:
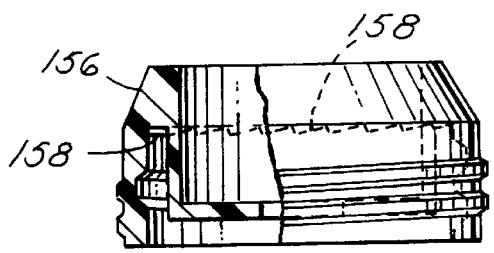
FIG. 23 is an elevational view of a fitment for use on the flexible tube shown in FIG. 22.
Figure 24:
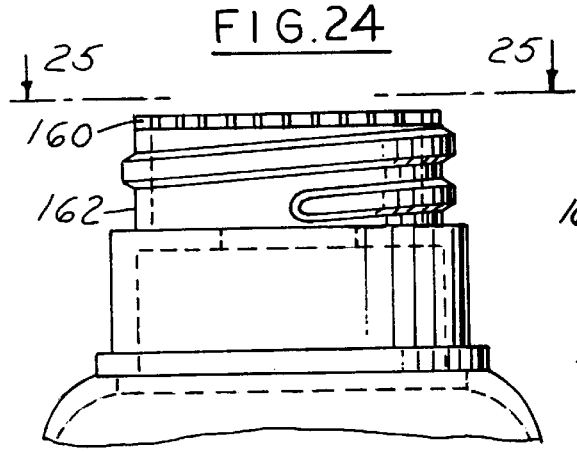
FIG. 24 is a fragmentary elevational view of another form of finish on the flexible tube.
Figure 26:
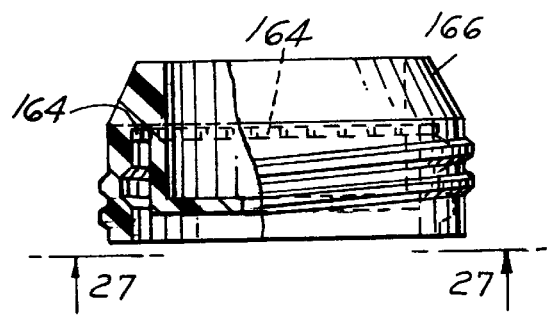
FIG. 26 is an elevational view of a fitment for use on the flexible tube shown in FIGS. 24 and 25.
Figure 25:
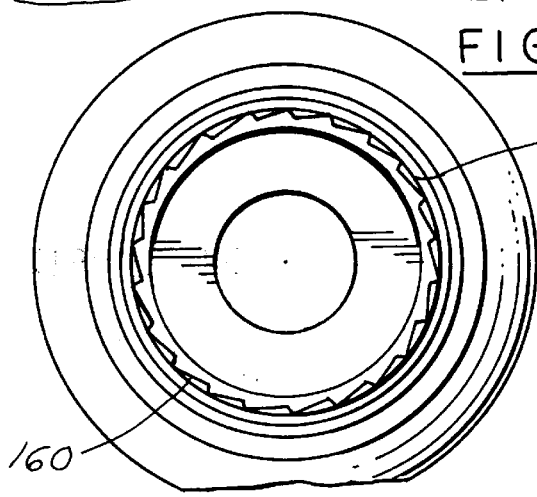
FIG. 25 is a view taken along line 25—25 in FIG. 24.
Figure 27:
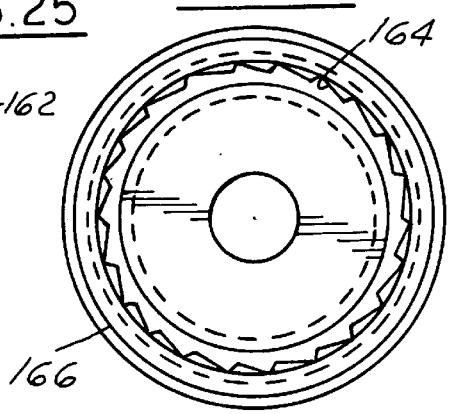
FIG. 27 is a view taken along the line 27—27 in FIG. 26.

Referring to FIGS. 22 and 23, there are shown a modified form of finish and collar which can be used where a collar, is used. As shown in FIG. 22, the annular wall 152 on the finish of the flexible tube is threaded and is formed with an annular array of asymmetrical ratcheting teeth 154 on the top surface. Collar 156 (FIG. 23) is formed with an annular array of complementary asymmetrical teeth 158 that engage teeth 154 when the collar 156 is threaded on the finish such that the collar can be removed.

In the form shown in FIGS. 24–27, the asymmetrical teeth 160 are provided on the outer surface of the annular wall 162. The asymmetrical teeth 164 on collar 166 are provided on an inner surface.

Referring to FIG. 29, a decorative metal band 164 is applied to the finish of the tube 42 shown in FIGS. 9–15. Band 164 includes an axial cylindrical wall 166 which has a portion that is complementary to wall 58. The band 164 includes a bead 168 that extends inwardly into groove 62, and an external groove 170. The band 164 includes an integral radial flange 172 which engages the top surface of the finish.

Figure 15:
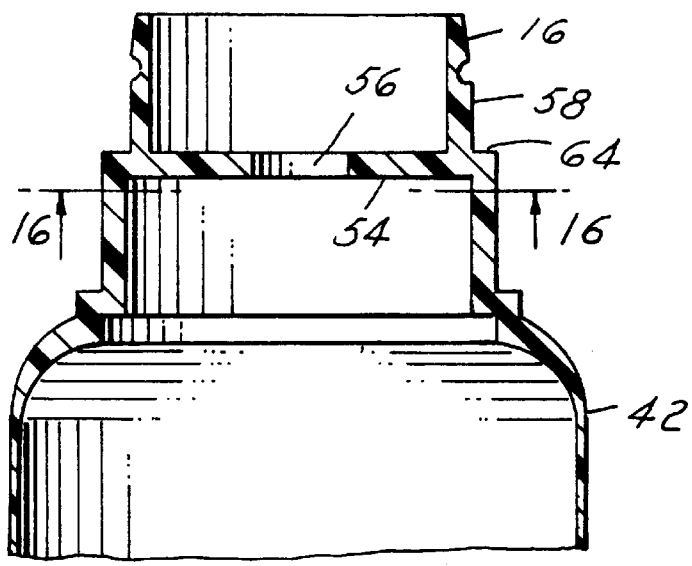
FIG. 15 is a fragmentary vertical sectional view of the upper end of the flexible tube.

In FIG. 30, there is shown a container with a metal band 164, similar to FIG. 29, wherein the tube 42a is identical to that in FIG. 15. The metal band includes a wall 166a which as a lower general cylindrical portion 166b and an upper upwardly and inwardly tapered portion 166c complementary to the tapered surface 60a of the annular wall 58a. The bead 168a is at the juncture of the tapered portion 166c and engages the groove 170a on the finish 58a. The band 164a also includes a radial flange 172a which engages the top surface of the finish 58a.

In the modified form of pump dispenser shown in FIGS. 31 and 32 is similar to that shown in FIG. 17, except that the annular concentric V-shaped ribs 84a, 86a are on the under surface of the flange 82a. In assembling the pump, the dispenser is inserted through the finish of the tube 42a and the flange 82a engages the upper outer surface of the transverse wall 54a. The flange 82a is then bonded to the transverse wall 54a by welding, as by ultrasonic welding as shown in FIG. 32, which is similar to that of FIG. 28.

We claim:

1. A flexible tube and pump dispenser comprising:

a flexible plastic tube having a first end and a second end, said tube including an integral rigid finish at one end, said integral finish having a radially inwardly extending transverse wall with an opening therethrough, a pump dispenser having a plunger and an axial body extending through said opening in said transverse wall of said finish, said axial body of said pump dispenser having a flange engaging said transverse wall of said finish, and means for holding said flange on said body in position engaging said transverse wall on said finish by fusion welding said flange on said body of the pump dispenser to said radially extending transverse wall, said flange of said pump mechanism being provided with an integral projection on the under side of said flange of the pump mechanism that is fused by fusion welding to the upper surface of said radially inwardly extending transverse wall on the finish.

2. The flexible tube and pump dispenser set forth in claim 1 wherein said welding is by sonic or ultrasonic welding.

3. The flexible tube and pump dispenser set forth in claim 1 wherein said projection comprises at least one annular rib on the under side of said flange of said pump mechanism.

4. The flexible tube and pump dispenser set forth in claim 3 including a second annular rib on said flange of said body concentric with said one rib, wherein one of said annular ribs has a greater axial height than the other before welding, said second annular rib being disposed radially inwardly of said one annular rib.

5. The flexible tube and pump dispenser set forth in claim 1 wherein said finish includes an integral annular wall extending upwardly from said radially extending transverse wall.

6. The flexible tube and pump dispenser set forth in claim 5 wherein said integral annular wall includes an annular groove for receiving an annular rib of an overcap.

7. The flexible tube and pump dispenser set forth in claim 6 wherein said annular wall has a free end including an annular external surface tapering upwardly and inwardly.

8. The flexible tube and pump set forth in any one of claim 5–7 including a metal cap on said annular wall.

* * * * *